Nov. 3, 1959   R. L. TOWNSEND   2,911,616
STRAIN RELIEF FOR STRANDED CABLE CONNECTION
Filed June 13, 1957

INVENTOR.
RAYMOND L. TOWNSEND
BY Hubert Miller
ATTORNEY

United States Patent Office 2,911,616
Patented Nov. 3, 1959

2,911,616

STRAIN RELIEF FOR STRANDED CABLE CONNECTION

Raymond L. Townsend, Los Gatos, Calif.

Application June 13, 1957, Serial No. 665,537

3 Claims. (Cl. 339—223)

This invention relates to a means for supporting stranded insulated cables at or near their points of connection to terminals, welding electrode holders, cable splicers, and cable connectors of various types.

Stranded insulated cables are widely used in various electrical systems, primarily for their great flexibility. Such cables have two serious disadvantages, however. One is the lengthwise movement of the cable insulation jacket away from the insulation bared end of the cable adjacent its point of attachment to a terminal, thus leaving a portion of the conductor exposed adjacent the cable connection region.

A much more serious fault is the fraying or breakage of individual wire strands in the cable as a result of sharp bending or flexing of the cable immediately adjacent the point of connection of the cable end to a terminal, such as the terminal of a welding electrode holder, for instance. Such sharp flexing causes relative movement between the strands near the diametral center of the cable and the strands surrounding them. Such movement causes abrasion and results in breakage of individual strands, which in turn results in poor electrical conductivity, heat due to resistance to current flow, and ultimately in cable failure.

It is the primary object of this invention to obviate the above described difficulties by providing a support for that portion of the cable adjacent its connection to a terminal, thereby eliminating sharp flexing of the cable in that region.

The invention will be more clearly understood when the following description is read in connection with the accompanying drawing in which.

Figure 1:
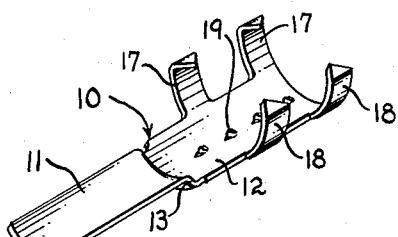
Fig. 1 is a perspective view of one type of cable connection support embodying my invention.

The Fig. 1 embodiment of my cable connection support is in the form of an elongated one piece rigid shell 10, preferably of steel or a suitable metal alloy. It includes an elongated transversely concavo-convex shank 11, and an integral elongated transversely concavo-convex socket 12. The socket is offset outwardly with respect to the center of curvature of the shank, the curved surfaces of the two being substantially concentric. While not essential, the transverse curvature of both the shank and socket is preferably described by fixed length radii moved about a common center.

Figure 3:
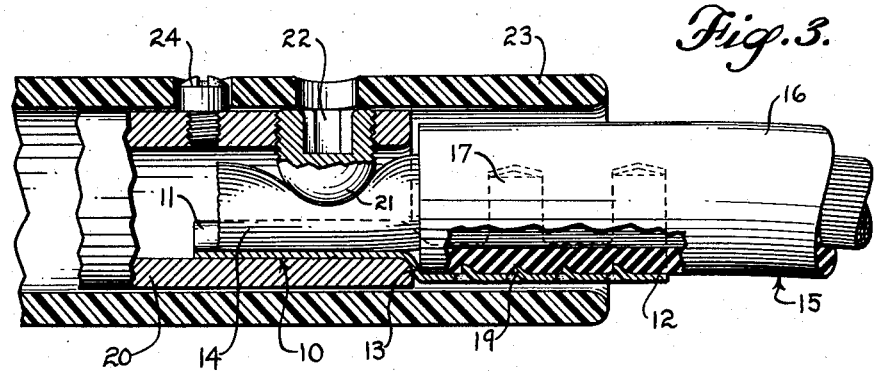
Fig. 3 is a longitudinal central sectional view through a portion of a tubular type terminal, with a bared cable end clamped therein, the cable support of Fig. 1 being installed in operative relation to the terminal and cable, and the entire assembly protected by an insulating sleeve.

The radius of curvature of the concave surface of shank 11 is preferably but not necessarily the same as the radius of the assembled strands of the cable to be supported, so that the shank portion of the support can snugly embrace the insulation bared end 14 of a stranded insulated cable 15, as clearly illustrated in Fig. 3.

Similarly the socket portion 12 of the support preferably has substantially the same radius of curvature as the exterior radius of curvature of the insulation jacket 16, so that socket 12 will snugly embrace the exterior of the cable adjacent its bared end 14.

The distance of radial offset between shank 11 and socket 12 is preferably substantially equal to the radial thickness of insulation jacket 16, also clearly illustrated in Fig. 3.

Figure 4:
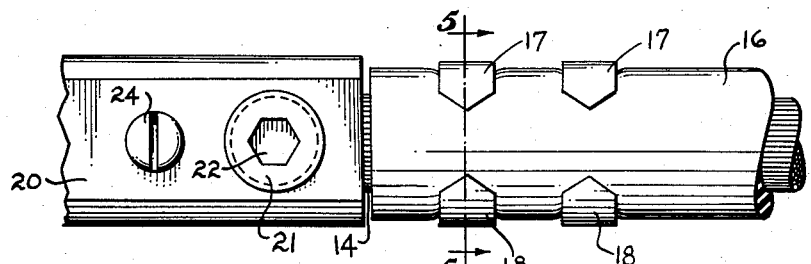
Fig. 4 is a top plan view of the assembly illustrated in Fig. 3 with the insulating sleeve omitted.
Figure 5:
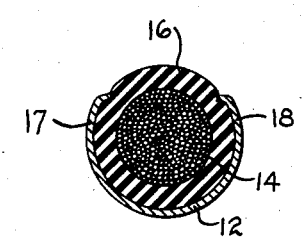
Fig. 5 is a transverse sectional view taken along the line 5—5 of Fig. 4.

At each of its side edges, socket 12 is provided with integral opposed cable jacket gripping arms 17 and 18, which are generally arcuate in configuration, and the free tip ends of which are bent inwardly, as clearly illustrated. Arms 17 and 18 are adapted to be bent or deformed into firm contact with the cable jacket 16 adjacent the bared end of the cable, and to thus firmly hold that portion of the cable seated in socket 12, as more clearly shown in Figs. 4 and 5. The pointed inwardly bent tips of the arms are partially embedded in the insulation material of which the cable jacket is formed. As an additional means of firmly anchoring the cable on its seat in socket 12, the socket is provided with a longitudinally disposed series of integral pointed teeth 19, which also embed themselves in the jacket material when arms 17 and 18 are deformed to grip the cable. These teeth, together with the tip ends of the arms, also positively prevent lengthwise movement of the jacket along the strands of the cable when installed.

Fig. 3 shows the installation and use of the above described cable connection support. Prior to assembly the cable end 14 is bared of insulation and the support 10 installed as previously described. The bared end 14 together with the shank 11 are then positioned on a cable end seat in the open end of a terminal 20 until offset 13 contacts the extreme end of the terminal. Clamping pressure is then applied toward the seat to firmly anchor both the shank 11 and the cable end 14 on the seat. In the type of terminal illustrated this clamping pressure is applied by a ball point set screw 21 having recessed socket 22 of irregular cross section in its head. In this case the set screw is in direct deforming contact with the strands of the cable. However, it will be understood that the terminal 20 could be rotated 180° with relation to the cable and the ball end of the set screw would then bear directly against shank 11 of the support, and the clamping pressure would be transmitted directly to the cable to firmly anchor both the shank and the cable end 14 on the terminal seat.

Fig. 3 includes a protective sleeve 23 of insulation material enclosing the assembly just described, and held against relative longitudinal movement by a fillister head screw 24. Ordinary wrap type insulation would be adequate in most installations.

In the assembly described it will be seen that the support 10 makes a rigid bridge between the end of terminal 20 and the adjacent portion of the cable 15, and that the support embraced portion of the cable is positively prevented by the support from being flexed in the region adjacent the bared end 14, which is the region in which cable failure usually occurs first. Furthermore, each of the described embodiments of the support which constitutes this invention positively prevents torsional movement of the composite cable at the critical point of connection.

Figure 2:
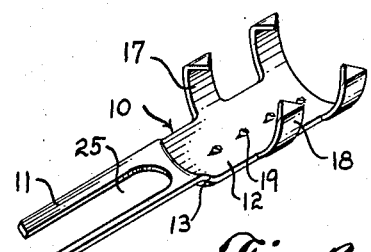
Fig. 2 is a similar view of a modified support, also embodying my invention.
Figure 6:
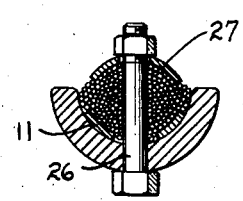
Fig. 6 is a transverse sectional view through an open seat type terminal and its clamped cable end, with the support of Fig. 2 installed thereon.

Referring to Figs. 2 and 6, the cable support illustrated differs from the previously described support by having its shank provided with a centrally located aperture 25 which is large enough to permit penetration of the shank by a cable clamping bolt 26, Fig. 6. Such bolts are commonly used with an arcuate cable clamping plate 27 when the terminal is of the type which has an open cable seat, as shown in this view. The installation, the function and the results produced by the Fig. 1 and Fig. 2 embodiments of the invention are substantially identical.

Having described the invention with sufficient clarity to enable those familiar with this art to construct and use it, I claim:

1. For an electrical device of the class wherein a cable terminal or connector is provided with a rigid elongated cable end seat which is concave in cross section, and a stranded insulated cable has one end bared of insulation and may be seated on said seat and held thereon by a clamping pressure directed toward the seat, a cable connection support to prevent flexing of the cable and consequent separation and breakage of the wire strands adjacent their seat comprising: a rigid one piece elongated shell of electrically conductive sheet metal made up of two integral elongated concavo-convex parts arranged end to end and offset radially with relation to each other, one of said parts constituting a shank adapted to lie alongside and in contact with the bared end of the cable, and to be held securely in such position by the mentioned clamping pressure applied toward the cable end seat, the other part of the shell constituting a socket for embracing that portion of the cable insulation jacket immediately adjacent the bared cable end; and integral opposed cable jacket gripping arms carried by opposite sides of said socket for at least partially encircling and gripping that portion of the cable insulation jacket adjacent the bared end of the cable.

2. For an electrical device of the class wherein a cable terminal or connector is provided with a rigid elongated cable end seat which is concave in cross section, and a stranded insulated cable has one end bared of insulation and may be seated on said seat and held thereon by clamping pressure directed toward the seat, a cable connection support to prevent flexing of the cable and consequent separation and breakage of the wire strands adjacent their seat comprising: a rigid one piece elongated shell of electrically conductive sheet metal made up of two integral elongated concavo-convex parts arranged end to end and offset radially with relation to each other a distance substantially equal to the radial thickness of the cable insulation jacket, one of said parts constituting a shank having a concave radius of curvature substantially the same as that of the bared cable end adapted to lie alongside and in contact with said bared end of the cable, and to be held securely in such position by the mentioned clamping pressure applied toward the cable end seat, the other part of the shell constituting a socket having a concave radius of curvature substantially the same as that of the cable insulation jacket for embracing that portion of the jacket immediately adjacent the bared cable end; and integral opposed cable jacket gripping arms carried by opposite sides of said socket for at least partially encircling and gripping that portion of the cable insulation jacket adjacent the bared end of the cable.

3. The cable connection support described in claim 2 in which the shank is provided with a central aperture to afford bolt penetration.

References Cited in the file of this patent

UNITED STATES PATENTS

| 1,876,786 | Stoody | Sept. 13, 1932 |
| 2,142,818 | Jacobson | Jan. 3, 1939 |